United States Patent Office 3,839,396
Patented Oct. 1, 1974

3,839,396
9-LOWER ALKYL-9-FLUORENYL CARBONATES
Hideo Otsuka, Osaka, and Ken Inouye, Kobe, Japan, assignors to Shionogi & Co., Ltd., Osaka, Japan
No Drawing. Filed June 27, 1972, Ser. No. 266,745
Claims priority, application Japan, July 15, 1971, 46/52,709; July 22, 1971, 46/54,815; Aug. 19, 1971, 46/63,181
Int. Cl. C07c 69/00, 103/50, 103/52
U.S. Cl. 260—463                    2 Claims

ABSTRACT OF THE DISCLOSURE

N-(9-Lower alkyl - 9 - fluorenyloxycarbonyl) - amino acids or -peptides useful as intermediates in the preparation of peptides, and new amino-protecting reagents of the general formula:

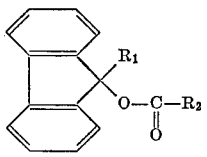

wherein $R_1$ is a lower alkyl group and $R_2$ is an azide group or a substituted or unsubstituted phenoxy group of the general formula:

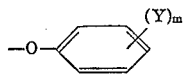

wherein $m$ is an integer of 1–5 and Y is a hydrogen atom, a nitro group or a halogen atom.

---

This invention relates to new N-protected amino acids or peptides, and new amino-protecting reagents therefor. More particularly, the present invention relates to N-(9-lower alkyl-9 - fluorenyloxycarbonyl) - amino acids or -peptides useful as an intermediate in the preparation of peptides, and to new amino-protecting reagents (I) of the general formula:

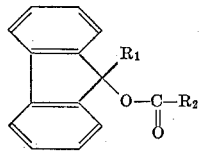

wherein $R_1$ is a lower alkyl group (e.g. methyl, ethyl, propyl) and $R_2$ is an azide group or a substituted or unsubstituted phenoxy group of the general formula:

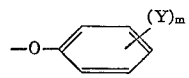

wherein $m$ is an integer of 1–5 and Y is a hydrogen atom, a nitro group or a halogen atom (e.g. fluorine, bromine, chlorine).

A peptide synthesis is characterized by the formation of an amide bond between the carboxyl group of one amino acid or peptide and the amino group of a second amino acid or peptide. It requires the protection of functional groups not participating in a desired amide formation, in order to avoid the undesirable formation of by-products. Therefore, a protecting group must fulfill the following requirements: (1) it must afford the protected amino acid or peptide readily and, desirably, in a quantitative yield; (2) its introduction must not bring about racemization in an amino acid to be protected; (3) it must retain its protecting property, preferably under all coupling conditions; (4) it must not give rise to side reactions; and (5) it must be readily and selectively removable in such a way that other protecting groups for the same or other functional groups are not undesirably affected.

As a result of studies on amino-protecting groups, it was discovered by the present inventors that 9-lower alkyl-9-fluorenyloxycarbonyl groups can be used for protection of an amino group during peptide synthesis, because they meet sufficently the requirements as hereinbefore set forth. The new amino-protecting groups can be introduced readily into an amino group of amino acids and they can be easily removed by treatment with an acid or by catalytic hydrogenolysis at any stage of peptide synthesis. The present invention has been completed on the basis of these observations.

It is, therefore, one object of the invention to provide new N-protected amino acids or peptides useful as an intermediate in the preparation of peptides. Another object of the invention is to produce new amino-protecting reagents useful in the peptide synthesis. These and other objects of the invention will be apparent from the following descriptions.

According to one aspect of the invention N-(9-lower alkyl-9-fluorenyloxycarbonyl) - amino acids can be prepared by acylating an amino acid or an ester thereof with a 9-lower alkyl-9-fluorenyloxycarbonyl compound (I) of the formula:

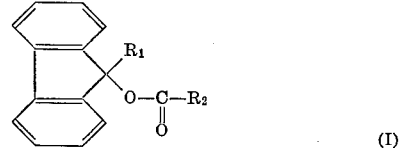   (I)

wherein $R_1$ is a lower alkyl group (e.g. methyl, ethyl, propyl) and $R_2$ is an azide group or a substituted or unsubstituted phenoxy group of the general formula:

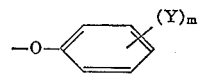

wherein $m$ is an integer of 1–5 and Y is a hydrogen atom, a nitro group or a halogen atom (e.g. fluorine, bromine, chlorine).

This acylation with compound (I) is entirely analogous to the amine-protecting procedures which can be employed for formation of the known N-(benzyloxycarbonyl)- or N-(t-butyloxycarbonyl) - amino acids using a corresponding protecting reagent [cf. Ber. 65, 1192 (1932); Helv. Chim. Acta 42 (2622 (1959); Ann. N.Y. Acad. Sci. 88, 676 (1960)]. Thus, the acylation is usually carried out at 0–60° C. for 1–24 hours, optionally in the presence of a solvent and an organic or inorganic base. The solvents which can be used are organic solvents (e.g. dimethylformamide, dimethylsulfoxide, dioxane, methanol, ethanol, acetone or aqueous solvent thereof). Examples of the base suitable for use in accelerating the reaction are alkali metal hydroxides (e.g. sodium hydroxide, potassium hydroxide), alkali metal carbonates (e.g. sodium carbonate, potassium carbonate), alkali metal bicarbonates (e.g. sodium bicarbonate, potassium bicarbonate), alkaline earth metal oxides (e.g. magnesium oxide), organic tertiary amines (e.g. pyridine, quinoline, trimethylamine, triethylamine) and trimethyl benzylammonium hydroxide. It is advantageous to use the acylating reagent in an amount equimolar with or in molar excess of, especially a 1.0~1.5-fold mole excess, the amino group to be protected.

The introduction of said amino-protecting group into an amino group can also be carried out by treating a 9-lower alkyl-9-fluorenol (II) of the general formula:

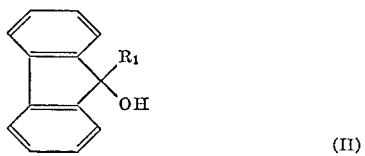

wherein $R_1$ is a lower alkly group (e.g. methyl, ethyl, propyl), with an isocyanate (III) of the general formula:

wherein $R_3$ is a group formed when the amino group is excluded from an amino acid ester, to give an N-(9-lower alkyl-9-fluoroenyloxycarbonyl)-amino acid ester (IV) of the general formula:

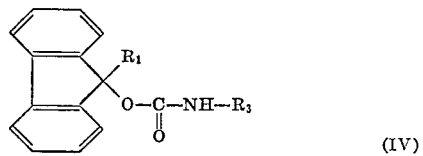

wherein $R_1$ and $R_3$ have each the same meaning as defined above.

This isocyanate reaction is also analogous to the known methods [Z. Naturforsch. 5b, 170 (1950); Ann. Chem. Liebigs 575, 217 (1952)]. The reaction is usually carried out in a suitable solvent at a temperature of from 50° C. to 130° C. for 0.5–6 hours, optionally in the presence of an organic base. The solvents suitable for use are benzene, toluene, xylene, anisol, isopropyl ether and the like. The preferable organic bases are pyridine, triethylamine, collidine and quinoline, and they may serve as the solvent.

The isocyanate (III) as the starting material can be prepared by treating an amino acid ester with phosgene in a conventional manner [Ann. Chem. Liebigs 575, 217 (1952)]. The preferable amino acid esters are the lower alkyl esters (e.g. methyl ester, ethyl ester, propyl ester) and the lower aralkyl esters (e.g. benzyl ester, p-nitrobenzyl ester).

Examples of amino acids available in the present invention are glycine, alanine, valine, norvaline, leucine, norleucine, isoleucine, serine, threonine, cysteine, cystine, methionine, aspartic acid, asparagine, glutamic acid, glutamine, lysine, ornithine, citruline, arginine, phenylalanine, tyrosine, histidine, tryptophane, proline, hydroxyproline, β-alanine, γ-aminobutyric acid, α-aminoisobutyric acid, sarcosine, α,β-diaminopropionic acid, α,γ-diaminobutyric acid and other naturally occurring or synthetic amino acids. These amino acids may be of the L-, D-, or DL-configuration. It is to be noted that when amino acids to be protected with the 9-lower alkyl-9-fluorenyloxycarbonyl group contain functional groups not participating in the reaction, such as amino, carboxyl, hydroxy, mercapto, guanidino, or imino group, the said functional groups may, if necessary, be protected with suitable known protecting groups usually employed in the field of peptide chemistry. That is, a carboxyl group is preferably protected by esterification, for example, with methanol, ethanol, tertiary butanol, benzyl alcohol, p-nitrobenzyl alcohol, phenols, or by amide formation; and an amino group, for example, by introducing a benzyloxycarbonyl, p-nitrobenzyloxycarbonyl, p-bromobenzyloxycarbonyl, t-butyloxycarbonyl, t-amyloxycarbonyl, p-methoxybenzyloxycarbonyl, 2-(p-diphenyl)-isopropyloxycarbonyl, trityl, tosyl, or formyl group. The hydroxy group of tyrosine and serine may be masked by an acetyl, benzyl, or t-butyl group; the mercapto group of cysteine by a benzyl, p-methoxybenzyl, or sulfenyl group; the guanidino group of arginine by a nitro, or tosyl group; and the imino group of histidine by a benzyl, benzyloxycarbonyl, tosyl, or t-butyloxycarbonyl group. These known protecting groups can be removed by hydrolysis, reduction or acidolysis at any stage of peptide synthesis in a conventional manner.

The N-(9-lower alkyl-9-fluorenyloxycarbonyl)-amino acids thus obtained can be used as intermediates for the preparation of peptides. That is, a new peptide containing 9-lower alkyl-9-fluorenyloxycarbonyl group as an amino-protecting group can be prepared by condensing an N-(9-lower alkyl-9-fluorenyloxycarbonyl)-amino acid with an other amino acid or peptide by known general methods. The coupling method used in this condensation is preferably the carbodiimide method [J. Am. Chem. Soc. 77, 1067 (1955); ibid. 78, 1367 (1956)], the carbonyldiimidazole method [Ann. 609, 75 (1957)], the activated ester method (e.g. p-nitrophenyl ester, N-hydroxysuccinimide ester, pentachlorophenyl ester, cyanomethyl ester, or p-nitrophenyl thiolester method) [Nature 175, 685 (1955); Helv. Chim. Acta 40, 373 (1957); J. Am. Chem. Soc. 86, 1839 (1966); Chem. Abstract 57, 7373 (1962); Helv. Chim. Acta 38, 80 (1955); Ann. 573, 99 (1962); Helv. Chim. Acta 39, 872 (1956)], the azide method [J. Prakt. Chem. 70, 73, 89 (1904); Collection Czechoslov. Chem. Communs. 26, 2333 (1961)], or the mixed anhydried method [J. Am. Chem. Soc. 74, 676 (1952)]. Peptide having an amino group protected with said amino-protecting group can also be prepared by the so-called solid phase synthesis [J. Am. Chem. Soc. 85, 2149 (1964)]. If necessary, the functional groups not participating in the coupling reaction, of the amino acids or peptides to be reacted with the N-(9-lower alkyl-9-fluorenyloxycarbonyl)-amino acid can be protected by the known protecting groups as mentioned above. It is to be noted that when the N-(9-lower alkyl-9-fluorenyloxycarbonyl)-amino acid obtained via the acylation procedure as described above is of an ester form, the ester is once hydrolysed by the usual method using an alkali and then the resultant N-acylated free acid as a carboxyl component is condensed with other amino acid or peptide as an amine component by the known methods. On the other hand, in the case where the N-(9-lower alkyl-9-fluorenyloxycarbonyl)-amino acid is an N-acylated free acid, it can be submitted, without hydrolysis procedures, to the subsequent peptide synthesis. Further, when ω-amino group of basic amino acid ester such as lysine or ornithine ester is acylated with the said amino-protecting reagent, the resultant $N^ω$-acylated product can be employed as an amine component in the coupling reaction, regardless of its ester form. Thus, repeated coupling reactions in combination with the deprotection process as described below give a desired longer-chain peptide.

At any stage of peptide synthesis using the N-(9-lower alkyl-9-fluorenyloxycarbonyl)-amino acid, the 9-lower alkyl-9-fluorenyloxycarbonyl group is cleaved from the protected amino acid or peptide by treatment with an acid or by catalytic hydrogenolysis. The removal of the 9-lower alkyl-9-fluorenyloxycarbonyl group by acidolysis using an acid with or without an appropriate solvent (organic solvent or water) is carried out by treating a solution or suspension of the N-(9-lower alkyl-9-fluorenyloxycarbonyl)-amino acid or -peptide with an organic or inorganic acid. The acid used in this reaction can be, for example, hydrogen halide (e.g. hydrogen fluoride, hydrogen bromide, hydrogen chloride), sulfuric acid, phosphoric acid, trifluoroacetic acid, acetic acid, formic acid, monochloroacetic acid, methanesulfonic acid, p-toluenesulfonic acid, a mixture thereof, or the like. When these acids are employed, the reaction proceeds smoothly at room temperature with evolution of carbondioxide. Usually the removal of the 9-lower alkyl-9-fluorenyloxycarbonyl group is complete within 30 minutes to 120 minutes at 0–60° C. It is uually preferred to effect the protecting group removal at low or moderate temperature since as is well known many peptides have a tendency to be adversely affected by an elevated temperature. For this reason and since heating is unnecessary the removal of said protecting group is advantageously conducted at 0–30° C., especially near room temperature. The acid may be employed in admixture with a solvent which does not interfere with the reaction, such as water, methanol, dichloromethane, acetic acid, ethyl acetate or acetonitrile. The acid used for the protecting group removal is usually employed in an excess, e.g. a 3~10-fold molar excess, of the amino acid or peptide to be deblocked.

Also the amino-protecting groups of the invention can be removed by hydrogenolysis in the presence of a catalyst such as palladium catalysts (e.g. palladium on charcoal, palladium black, palladium on barium sulfate), platinum catalysts (e.g. platinum oxide, ruthenium catalysts (e.g. ruthenium on charcoal) or nickel catalysts (e.g. Raney-nickel). This hydrogenolysis can be carried out according to the usual method employed in the field of peptide chemistry. Thus, the 9-lower alkyl-9-fluorenyloxycarbonyl group can be split off usually by hydrogenating the N-(9-lower alkyl-9-fluorenyloxycarbonyl)-compound in the presence of such a catalyst and a solvent at or near room temperature for 30 minutes to 6 hours. The solvent which can be used in this catalytic hydrogenolysis is, for example, methanol, ethanol, acetic acid and a mixture thereof.

The N-(9-lower alkyl-9 - fluorenyloxycarbonyl)-amino acids or -peptides obtained in the above-described procedure are novel and valuable intermediates for the preparation of biologically active polypeptides, and constitute one aspect of the invention. Since the 9-lower alkyl-9-fluorenyloxy-carbonyl group is split off much faster than the well known benzyloxycarbonyl, or t-butyloxycarbonyl group by acidolysis, the present amino-protecting groups are selectively removable, even in the presence of such known protecting groups. Thus, for example, in an amino acid or peptide containing two amino groups which are to be blocked, the 9-lower alkyl - 9 - fluorenyl-oxycarbonyl group can be used for the protection of one amino group and the benzyloxycarbonyl group for the other; the former can be removed by mild acidolysis using formic acid, acetic acid or trifluoroacetic acid in the presence or absence of solvent (e.g. dichloromethane, water), which does not affect the latter, and the latter can be subsequently removed by catalytic hydrogenolysis. Also, since the amino-protecting group of the invention is stable under alkaline conditions, esters of the amino acids or peptides bearing the said group can be saponified without affecting the group. These are an especially advantageous feature of the present amino protecting groups. Further, the amino-protecting groups of the invention can be readily introduced into an amino group of amino acids in a satisfactory yield without the occurrence of side reactions and racemizations. They retain their protecting properties during coupling conditions. Moreover, since the 9-lower alkyl-9-fluorenyloxycarbonyl groups have characteristic UV absorption bands at a region of 208–210 and 272–275 nm., this property is useful to detect the desired reaction product during the course of synthesis or purification.

On the other hand, according to one aspect of the invention, the N-acylating reagents, I, can be prepared by reacting a 9-lower alkyl-9-fluorenol (II) of the general formula:

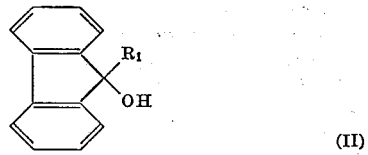

(II)

wherein $R_1$ is a lower alkyl group (e.g. methyl, ethyl, propyl), with a haloformate (V) of the general formula:

(V)

wherein X is a halogen atom (e.g. fluorine, bromine, chlorine) and $R_4$ is a substituted or unsubstituted phenyl group of the general formula:

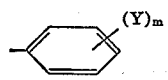

wherein $m$ is an integer of 1–5 and Y is a member selected from the group consisting of a hydrogen atom, a nitro group and a halogen atom (e.g. fluorine, bromine, chlorine), to give a carbonate (VI) of the general formula:

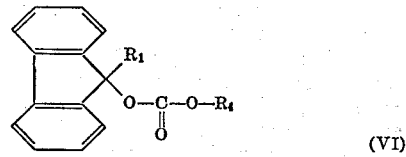

(VI)

wherein $R_1$ and $R_4$ have each the same meaning as defined above; or by reacting the resultant carbonate (VI) with hydrazine and treating the resultant carbazate (VII) of the general formula:

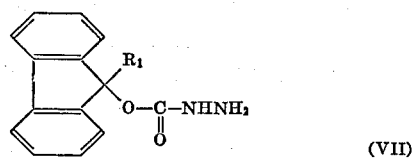

(VII)

wherein $R_1$ has the same meaning as defined above, with a nitrite (VIII) of the general formula:

$$R_5-NO_2 \quad (VIII)$$

wherein $R_5$ is a member selected from the group consisting of hydrogen atom, lower alkyl group (e.g. isoamyl, t-butyl) and alkali metal (e.g. sodium, potassium), in an acid medium, to give an azidoformate (IX) of the general formula:

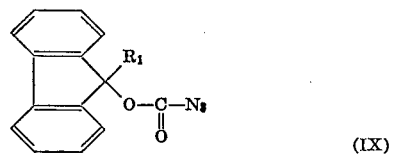

(IX)

wherein $R_1$ has the same meaning as defined above.

The reaction between compounds (II) and (V) is usually carried out in a suitable solvent in the presence of a base at —10° C. to 50° C. for 1–6 hours; thus yielding compound (VI). The preferable solvents which can be used are dichloromethane, and chloroform. The base suitable for use is, for example, an organic base such as pyridine, quinoline, dimethylaniline, triethylamine, trimethyl benzylammonium hydroxide or the like.

The reaction between compounds (VI) and hydrazine is usually performed in the presence of a polar solvent at 0–40° C. for 1–24 hours; thus yielding compound (VII). The preferable amount of hydrazine is 1–4 moles per mole of compound (VI). It is preferred to use a polar solvent such as methanol, ethanol, dimethylformamide, or dimethylsulfoxide in the carbazate formation.

The reaction between compounds (VII) and (VIII) is usually conducted in a suitable solvent in the presence of an acid medium at a temperature of from —40° C. to room temperature for 10–60 minutes; thus yielding compound (IX). Preferable solvents are, for example, acetonitrile, dimethylformamide, dimethylsulfoxide, acetic acid or an aqueous solvent thereof. It is preferred to use, as an acid medium, inorganic acids (e.g. hydrochloric acid) or organic acids (e.g. acetic acid).

The starting material, II, can be prepared, for example, by treating a 9-fluorenone (X) of the formula:

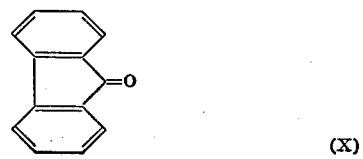

(X)

with a Grignard reagent (XI) of the general formula:

$$R_1MgX \quad (XI)$$

wherein $R_1$ is a lower alkyl group (e.g. methyl, ethyl, propyl) and X is a halogen atom (e.g. fluorine, bromine, chlorine, iodine), and hydrolysing the resulting product in a conventional manner.

The other starting material, V, can be prepared, for example, by treating a corresponding aryl alcohol with phosgene or carbonyl chloride halide in the usual manner.

The N-acylating reagents I (VI, IX) thus obtained are very useful for the protection of an amino group of amino acids or peptides, because they show excellent amino-protecting properties as mentioned above. In addition to amino-protection, the said reagents may be used for protection of other functional groups such as the hydroxy group of tyrosine and the thiol group of cysteine.

The following examples are intended to illustrate the invention and are not be construed as being limitations thereon, many variations of which are possible.

EXAMPLES

I: 9-Alkyl-9-Fluorenyloxycarbonylating Reagents

EXAMPLE 1

Preparation of 9-methyl-9-fluorenyl phenyl carbonate

An ethereal solution of methyl magnesium iodide, prepared from 0.36 mmole of methyl iodide in the usual manner, was added dropwise to a solution of 9-fluorenone (54.0 g.) in ether (350 ml.) below 10° C. over 2 hours. The mixture was stirred at room temperature for 2 hours and allowed to stand overnight. The resulting solution was poured onto cracked ice and the mixture was acidified with hydrochloric acid, then extracted with ether. The ether extracts were combined, dried over magnesium sulfate and evaporated under reduced pressure to afford a solid residue. The residue was treated with chloroform to give 9-methyl-9-fluorenol in a pure crystalline form (47.8 g.). From the filtrate an additional quantity of crystal was isolated (8.0 g.), and the total yield amounted to 55.8 g.; m.p. 174–175° C. Recrystallization from carbon tetrachloride did not alter the melting point.

UV $\lambda_{max.}^{CH_3OH}$ 208 nm. (40,300) 275 nm. ($\epsilon$ 13,600).

Analysis.—Calcd. for $C_{14}H_{12}O$: C, 85.68; H, 6.16. Found: C, 85.87; H, 6.07.

A portion (19.6 g.) of the product obtained above was dissolved in dichloromethane (200 ml.) and to the solution was added pyridine (10.6 ml.). The solution was chilled in an ice bath and to the solution was added dropwise a solution of phenyl chloroformate (20.4 g.) in dichloromethane (50 ml.) over 60 minutes. The mixture was stirred for 2 hours at 0° C. and one hour at room temperature. The reaction mixture was then washed with ice-cold water, dried over magnesium sulfate and evaporated under reduced pressure. The resulting solid residue was recrystallized from carbon tetrachloride-n-haxane; yield 28.7 g. m.p. 98–99° C.

Analysis.—Calcd. for $C_{21}H_{16}O_3$: C, 79.73; H, 5.10. Found: C, 79.75; H, 5.07.

EXAMPLE 2

Preparation of 9-methyl-9-fluorenyl carbazate and 9-methyl-9-fluorenyl azidoformate The phenyl carbonate (28.5 g.) obtained in Example 1 was dissolved in warm ethanol (400 ml.) and the solution was allowed to cool to room temperature. To the solution was added 100% hydrazine hydrate (18.2 ml.) and the mixture was stirred at room temperature for one hour, then allowed to stand overnight. After removal of the solvent by evaporation under reduced pressure, the residue was dissolved in ether and the solution was washed with N sodium hydroxide (100 ml.×2) and water (100 ml.×2), dried over magnesium sulfate and evaporated under reduced pressure to afford a crystalline residue. Repeated recrystallization from dichloromethane-ether-n-hexane yielded 9-methyl-9-fluorenyl carbazate in a pure form; yield 18.5 g., m.p. 124–125° C., UV $\lambda_{max.}^{CH_3OH}$ 210 nm. ($\epsilon$ 43,600), 272 nm. ($\epsilon$ 14,400).

Analysis.—Calcd. for $C_{15}H_{14}N_2O_2$: C, 70.85; H, 5.55; N, 11.02. Found: C, 71.16; H, 5.59; N, 11.28.

A solution of the carbazate (1.27 g.), obtained above, in acetonitrile (15 ml.) and a mixture of 6N hydrochloric acid (2.5 ml.) and acetonitrile (5 ml.) were each chilled in a Dry-Ice acetone bath to −30∼−35° C. and they were combined. To the mixture was then carefully added 5M sodium nitrite (1.1 ml.) over 10 minutes and the resulting mixture was stirred at this temperature for 10 minutes. The reaction mixture was neutralized with 2N sodium hydroxide to pH 7–8. The bath was removed allowing the temperature to rise to 0° C. Then, ice-cold water (10 ml.) was introduced and the resulting precipitate was collected by filtration, washed thoroughly with cold water and dried over phosphorus pentoxide under reduced pressure in a cold room to give 9-methyl-9-fluorenyl azidoformate; yield 1.25 g., m.p. 109–110° C. (decomp.), UV $\lambda_{max.}^{CH_3OH}$ 210 nm. ($\epsilon$ 37,500), 273 nm. ($\epsilon$ 14,400).

Analysis.—Calcd. for $C_{15}H_{11}N_3O_2$: C, 67.92; H, 4.18; N, 15.84. Found: C, 67.89; H, 4.29; N, 16.01.

EXAMPLE 3

Preparation of 9-methyl-9-fluorenyl p-nitrophenyl carbonate

9-Methyl-9-fluorenol (1.96 g.) was dissolved in dichloromethane (20 ml.) and to the solution was added pyridine (1.06 ml.). The solution was chilled in an ice-bath and to the solution was added a solution of p-nitrophenyl chloroformate (2.62 g.) in dichloromethane (5 ml.). The mixture was stirred for 2 hours at 0° C. and one hour at room temperature. The reaction mixture was then washed with ice-cold water, dried over magnesium sulfate and evaporated under reduced pressure to give 9-methyl-9-fluorenyl p-nitrophenyl carbonate as a crystalline residue, which was treated with ether-n-haxane and dried; yield 2.89 g., IR (Nujol): 1773 (C=O), 1263

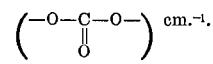 cm.⁻¹.

II: N-(9-Methyl-9-Fluorenyloxycarbonyl)-Amino Acids and -Peptides

EXAMPLE 4

Preparation of N-(9-methyl-9-fluorenyloxycarbonyl)-L-phenylalanine methyl ester (a) Isocyanate method: L-Phenylalanine methyl ester hydrochloride (1.08 g.) was suspended in anhydrous toluene (15 ml.) and dry phosgene was bubbled into the suspension at a bath temperature of 120–130° C. for 90 minutes. The resulting clear solution was evaporated under reduced pressure to give carbonyl-L-phenylalanine methyl ester as an oil. A mixture of 9-methyl-9-fluorenol (0.90 g.), pyridine (2 ml.) and the isocyanate obtained above was heated under reflux for 2 hours and evaporated under reduced pressure. The residue was dissolved in chloroform and applied to a column, which was previously prepared in chloroform, of silica gel (40 g., 0.05–0.2 mm., E. Merck). The column was developed with chloroform containing 1% methanol and 10 ml.-fractions were collected. The tubes (No. 5–13) containing the desired product were pooled and evaporated under reduced pressure to give a residue, which was recrystallized from ether-petroleum ether; yield 1.24 g., m.p. 100–105° C., $[\alpha]_D^{22}+73.0\pm1.2°$ (c. 1.0, chloroform), UV $\lambda_{max.}^{CH_3OH}$ 210 nm. ($\epsilon$ 44,900), 272 nm. ($\epsilon$ 13,950).

Analysis.—Calcd. for $C_{25}H_{23}NO_4$: C, 74.80; H, 5.78; N, 3.49. Found: C, 74.66; H, 5.89; N, 3.41.

(b) Acylation with azidoformate: L-Phenylalanine methyl ester hydrochloride (0.87 g.) was dissolved in dimethylformamide (10 ml.), and triethylamine (1.4 ml.) was added. The solution was chilled in an ice bath and to the solution was added 9-methyl-9-fluorenyl azidoformate (1.25 g.) with dimethylformamide (5 ml.). The mixture was stirred at 0° C. for a few hours, kept at room temperature overnight and then evaporated under reduced pressure. The resultant residue was dissolved in dichloromethane and the solution was washed with water, dried over magnesium sulfate and evaporated under reduced pressure. The resulting crystalline residue was recrystallized from ether-petroleum ether; yield 1.21 g., m.p. 100–105° C. $[\alpha]_D^{24}+72.3\pm1.1°$ (c. 1.0, chloroform).

Analysis.—Calcd. for $C_{25}H_{23}NO_4$: C, 74.80; H, 5.78; N, 3.49. Found: C, 74.77; H, 5.87; N, 3.41.

(c) Acylation with p-nitrophenyl carbonate: To a solutiion of L-phenylalanine methyl ester hydrochloride (0.43 g.) and triethylamine (0.56 ml.) in dimethylformamide-dichloromethane (0.6 ml., 1:1 by volume) was added 9-methyl-9-fluorenyl p-nitrophenyl carbonate (0.72 g.). The mixture was stirred at room temperature for 3 days. After the solvent was removed by evaporation under reduced prossure, the residue was dissolved in dichloromethane and the solution was washed with water, dried over magnesium sulfate and evaporated under reduced pressure. The residue was fractionated for purification on a silica gel column in the same manner as in Example 4(a); yield 0.45 g., m.p. 100–102° C., $[\alpha]_D^{24}+72.6\pm1.2°$ (c. 1.0, chloroform).

Analysis.—Calcd. for $C_{25}H_{23}NO_4$: C, 74.80; H, 5.78; H, 5.78; N, 3.49. Found: C, 74.75; H, 5.80; N, 3.45.

EXAMPLE 5

Preparation of N-(9-methyl-9-fluorenyloxycarbonyl)-L-phenylalanine (dicyclohexylamine salt)

L-Phenylalanine (1.65 g.) was dissolved in 40% Triton B (methanol solution of trimethyl benzylammonium hydroxide, 4.7 ml.), and the solution was evaporated under reduced pressure. To the solution were then added triethylamine (2.1 ml.) and a solution of 9-methyl-9-fluorenyl azidoformate (2.65 g.) in dimethylformamide (7 ml.). The reaction mixture was stirred at room temperature for 6 hours and then evaporated under reduced pressure. The residue was chilled in an ice-bath and acidified with ice-cold M citric acid in the presence of ether. The aqueous layer was extracted twice with cold ether. The ethereal solutions were combined, dried over magnesium sulfate and evaporated under reduced pressure to give N-(9 - methyl - 9 - fluorenyloxycarbonyl) - L - phenylalanine as a sirupy residue. The sirup was dissolved in ether (100 ml.) and to the solution was introduced dicyclohexylamine (2.0 ml.). The crystalline amine salt of the desired product which separated was collected, washed with ether and dried under reduced pressure. Recrystallization from methanol-ether yielded 5.25 g.; m.p. 177–179° C. (decomp.), $[\alpha]_D^{24}+54.3\pm1.0°$ (c. 1.0, methanol).

Analysis.—Calcd. for $C_{24}H_{21}NO_4.C_{12}H_{23}N$: C, 76.02; H, 7.80; N, 4.93. Found: C, 76.05; H, 7.76; N, 5.21.

EXAMPLE 6

Preparation of N-(9-methyl-9-fluorenyloxycarbonyl)-glycine

Glycine (0.75 g.) was acylated with 9-methyl-9-fluorenyl azidoformate (2.65 g.) in the same manner as in Example 4(b). The desired compound was crystallized from dichloromethane and then recrystallized from ethanol; yield 0.78 g., m.p. 157–159° C. (decomp.).

Analysis.—Calcd. for $C_{17}H_{15}NO_4$: C, 68.68; H, 5.09; N, 4.71. Found: C, 68.77; H, 5.22; N, 4.74.

EXAMPLE 7

Preparation of N-(9-methyl-9-fluorenyloxycarbonyl)-γ-benzyl-L-glutamic acid (cyclohexylamine salt)

To a suspension of L-glutamic acid γ-benzyl ester (2.37 g.) in dimethylformamide (40 ml.) were added triethylamine (3.5 ml.) and a solution of 9-methyl-9-fluorenyl azidoformate (3.45 g.) in dimethylformamide (10 ml.) and the mixture was stirred at room temperature for 48 hours. After removal of the solvent by evaporation under reduced pressure at a bath temperature of 45° C., the residue was dissolved in ether. The solution was washed with ice-cold 10% citric acid, dried over magnesium sulfate, then evaporated under reduced pressure to give N-(9-methyl-9-fluorenyloxycarbonyl)-L-glutamic acid γ-benzyl ester as a sirupy residue. The residue was dissolved in ether and to the solution was added cyclohexylamine (1.0 g.). The crystalline amine salt which separated during storage at 4° C. overnight was collected by filtration, washed with cold ether, and dried. Recrystallization from methanol-ether afforded a cyclohexylamine salt of the desired product in a pure form; yield 3.48 g., m.p. 109–111° C., $[\alpha]_D^{25}+11.5\pm0.6°$ (c. 1.0, methanol).

Analysis.—Calcd. for $C_{27}H_{25}NO_6.C_6H_{13}N$: C, 70.95; H, 6.86; N, 5.01. Found: C, 70.89; H, 6.88; N, 5.10.

EXAMPLE 8

Preparation of N-9-methyl - 9 - fluorenyloxycarbonyl)-L-tryptophan (dicyclohexylamine salt) and some N-protected amino acid derivatives L-Tryptophan (2.04 g.) was dissolved in Triton B (4.7 ml.) and the solution was concentrated under reduced pressure. The resulting residue was dissolved in dimethylformamide (4 ml.) and then chilled in an ice bath. To the solution was added 9-methyl-9-fluorenyl azidoformate (2.65 g.) together with dimethylformamide (7 ml.), and triethylamine (2.75 ml.) was added thereto at room temperature. The mixture was stirred at room temperature for 5 hours and kept at 0° C. overnight. The reaction mixture was concentrated under reduced pressure to give an oily residue. The residue was mixed with ethyl acetate (50 ml.) and water (50 ml.), and adjusted to pH 3–4 with M citric acid. The acidified solution was extracted with ethyl acetate and the organic extracts were combined, dried over magnesium sulfate and evaporated under reduced pressure to give N-(9-methyl-9-fluorenyloxycarbonyl)-L-tryptophan as an oil. The oil was dissolved in ethyl acetate (50 ml.) and to the solution was added dicyclohexylamine (1.8 g.). After removal of the solvent by evaporation, the residue was treated with ether to afford N-(9-methyl-9-fluorenyloxycarbonyl) - L - tryptophan dicyclohexylamine salt as an amorphous product; yield 5.54 g. $[\alpha]_D^{23}+54.1\pm1.0°$ (c. 1.0, methanol).

Analysis.—Calcd. for $C_{38}H_{45}N_3O_4$: C, 75.09; H, 7.46; N, 6.91. Found: C, 74.72; H, 7.54; N, 6.70.

In the same manner as above, there were obtained the following compounds:

N - (9 - methyl - 9 - fluorenyloxycarbonyl) - 0 - benzyl-L-serine dicyclohexylamine salt; yield 92%, m.p. 155–159° C., $[\alpha]_D^{23}+22.3\pm1.0°$ (c., 1.0 methanol).

Analysis.—Calcd. for $C_{37}H_{46}N_2O_5$: C, 74.22; H, 7.74; N, 4.68. Found: C, 73.88; H, 7.96; N, 4.80.

N - (9 - methyl - 9 - fluorenyloxycarbonyl) - L - alanine dicyclohexylamine salt; yield 75%, m.p. 148–150° C., $[\alpha]_D^{22}-18.8\pm1.0°$ (c. 1.0, methanol).

Analysis.—Calcd. for $C_{30}H_{40}N_2O_4$: C, 73.14; H, 8.18; N, 5.69. Found: C, 73.24; H, 8.30; N, 5.56.

$N^\alpha$ - (9 - methyl - 9 - fluorenyloxycarbonyl) - $N^\epsilon$ - benzyloxycarbonyl-L-lysine cyclohexylamine salt; yield 63% amorph., $[\alpha]_D^{22}+12.3\pm1.0°$ (c. 0.6, methanol).

Analysis.—Calcd. for $C_{35}H_{43}N_3O_6$: C, 69.86; H, 7.20; N, 6.98. Found: C, 68.87; H, 7.33; N, 6.88.

N$^\alpha$ - (9 - methyl - 9 - fluorenyloxycarbonyl) - N$^\epsilon$ - benzyloxycarbonyl-L-lysine dicyclohexylamine salt; yield 62%, amorph., $[\alpha]_D^{22}$ +10.9±1.0° (c. 1.0 methanol).

Analysis.—Calcd. for $C_{41}H_{53}N_3O_5 \cdot H_2O$: C, 71.07; H, 7.86; N, 6.06. Found: C, 70.57; H, 7.71; N, 6.07.

N - (9 - methyl - 9 - fluorenyloxycarbonyl) - L - glutamine dicyclohexylamine salt; yield 83%, amorph., $[\alpha]_D^{22}$ +1.1±1.0° (c. 1.0 methanol).

Analysis.—Calcd. for $C_{32}H_{43}N_3O_5 \cdot 1/2 H_2O$: C, 68.79; H, 7.94; N, 7.52. Found: C, 68.86; H, 7.94; N, 7.53.

EXAMPLE 9

Preparation of N-(9-methyl-9-fluorenyloxycarbonyl)-L-phenylalanyl-L-phenylalanine methyl ester N-(9-Methyl - 9 - fluorenyloxycarbonyl)-L-phenylalanine dicyclohexylamine salt (2.84 g.) was suspended in a mixture of water (20 ml.) and ether (40 ml.) and the suspension was chilled in an ice bath. To the suspension was addded M citric acid and the mixture was shaken until the solid dissolved completely. The aqueous phase was separated and extracted with ether (20 ml.×2). The ethereal extracts combined were dried over magnesium sulfate and evaporated under reduced pressure to give an oily residue. To the oil was added L-phenylalanine methyl ester (prepared from the corresponding hydrochloride (5 mmole) in the usual manner) with methylene dichloride (20 ml.), and N,N'-dicyclohexylcarbodiimide (1.03 g.) was added thereto. The mixture was allowed to stand at 0° C. overnight with stirring. The reaction mixture was filtered to remove the precipitated dicyclohexylurea and the filtrate was evaporated under reduced pressure to give a colorless oil. The oil was dissolved in ethyl acetate (40 ml.) and the solution was washed with ice cold 10% citric acid and then 50% sodium bicarbonate. The organic phase was dried over magnesium sulfate and evaporated under reduced pressure to give N-(9-methyl-9-fluorenyloxycarbonyl)-L-phenylalanyl - L - phenylalanine methyl ester as a foamy residue, which was dried over phosphorus pentoxide to afford a colorless powder in 2.56 g. yield. The product gave a single spot in thin-layer chromatography on silica gel in a solvent system of chloroform-methanol (9:1, by volume). $[\alpha]_D^{23}$ −10.4±0.5° (c. 1.0, methanol).

EXAMPLE 10

Preparation of N-(9-methyl - 9 - fluorenyloxycarbonyl)-L-phenylalanine dicyclohexylamine salt (by saponification of the ester)

N-(9-Methyl - 9 - fluorenyloxycarbonyl)-L-phenylalanine methyl ester (0.40 g.) was dissolved in methanol (4 ml.) and to the solution was added 2N sodium hydroxide (1 ml.). The mixture was stirred at room temperature for 30 minutes. Then, the reaction mixture was neutralized with M-citric acid under ice-cooling. After removal of the organic solvent by evaporation under reduced pressure, the resultant solution was acidified with M-citric acid under cooling and then extracted with ethyl acetate. The organic extracts combined were washed thoroughly with water, dried over magnesium sulfate and evaporated under reduced pressure to give N-(9-methyl-9-fluorenyloxycarbonyl)-L-phenylalanine as a sirupy residue, which was dissolved in ether (20 ml.). To the solution was added dicyclohexylamine (0.2 ml.) and the mixture was allowed to stand to afford N-(9-methyl-9-fluorenyloxycarbonyl)-L-phenylalanine dicyclohexylamine salt; yield 0.36 g., m.p. 177-178° C. (decomp.), $[\alpha]_D^{24}$ +54.0±1.0° (c. 1.0, methanol).

Analysis.—Calcd. for $C_{24}H_{21}NO_4 \cdot C_{12}H_{23}N$: C, 76.02; H, 7.80; N, 4.93. Found: C, 76.11; H, 7.73; N, 4.90.

III: Removal of protecting group

EXAMPLE 11

Preparation of L-phenylalanyl - L - phenylalanine formate (by acidolysis)

N-(9-Methyl - 9 - fluorenyloxycarbonyl)-L-phenylalanyl-L-phenylalanine methyl ester (0.20 g.) obtained as in Example 9 was dissolved in 20% formic acid/dichloromethane (1 ml.) and the solution was kept at room temperature for 30 minutes. After addition of water (10 ml.) and ether (10 ml.), the reaction mixture was shaken and the aqueous phase was separated. The aqueous solution was washed with water and lyophilized to give a powder. The powder was crystallized from methanol and ether and recrystallized from the same solvent; yield 0.08 g., m.p. 113–114° C., $[\alpha]_D^{25}$ +3.8±1.0 (c. 1.0, methanol).

EXAMPLE 12

Preparation of L-alanine from N-(9-methyl-9-fluorenyloxycarbonyl) - L - alanine dicyclohexylamine salt (by catalytic hydrogenolysis)

N-(9-Methyl - 9 - fluorenyloxycarbonyl)-L-alanine dicyclohexylamine salt (493 mg.) was suspended in a mixture of ethyl acetate and 10% citric acid (10 ml.). The suspension was shaken under ice-cooling until the solid dissolved completely. The organic phase was separated, washed with water, dried over magnesium sulfate and evaporated under reduced pressure to give the free acid as an oil. The oil was dissolved in methanol (10 ml.) and hydrogenated over palladium black catalyst at room temperature for 3 hours. After removal of the catalyst by filtration the filtrate was concentrated under reduced pressure to afford a residue, to which were added ether and water. The aqueous phase separated was evaporated under reduced pressure to give a crystalline residue. The residue was recrystallized from ethanol-water to give L-alanine in a quantitative yield. This product showed a ninhydrin positive single spot identical to that of the authentic sample in thin-layer chromatography; yield 86 mg., m.p. 296° C. (decomp.).

IV: Kinetics of acidolytic removal of amino-protecting groups

EXAMPLE 13

Kinetics of acidolytic removal of the present amino-protecting groups was examined in comparison with those of known amino-protecting groups, 2-(p-diphenyl)-isopropyloxycarbonyl, and t-butyloxycarbonyl groups, which are removable by mild acid solvolysis.

Test Compounds

N-(9-Methyl-9-fluorenyloxycarbonyl) - L - phenylalanine dicyclohexylamine salt (Mfoc.Phe.DCHA), N-(9 - Methyl-9-fluorenyloxycarbonyl)-L-phenylalanyl-L-phenylalanine methyl ester (Mfoc.Phe.Phe.OMe), N-[2-(p-Diphenyl)-isopropyloxycarbonyl] - L - phenylalanine dicyclohexylamine salt (Bpoc.Phe.DCHA), N-[2-(p-Diphenyl)-isopropyloxycarbonyl] - L - phenylalanyl-L-phenylalanine methyl esther (Bpoc.Phe.Phe.OMe), N-(t-Butyloxycarbonyl)-L-phenylalanine dicyclohexylamine salt (Boc.Phe.DCHA).

Methods

[A] By means of optical rotation measurement

A test compound (20 mg.) was made up to 1 ml. by the addition of an acid. The solution was immediately placed in a cell and its optical rotation was measured at 25° C. in constant time-intervals to determine the concentration of the test compound remaining in the acid medium. Rate constant of the acidolysis was calculated from the following equation:

$$\frac{dx}{dt} = k_1(a-x) \rightarrow k_1 = \frac{1}{t} \ln (a/a-x) = \frac{2.303}{t} \log (a/a-x)$$

wherein $k_1$ is a first-order rate constant; $a$ is an initial concentration of the test compound; and $x$ is an amount that has undergone the reaction in time $t$. Also, a half-life ($\tau$) of the protecting group in the acidolysis was determined from the above equation when $x$ is $a/2$, i.e. the equation $\ln 2/k_1 = (2.303) \log 2/k_1$.

[B] By means of potentiometric titration

A test compound (0.2 mmole) was made up to 2 ml. by the addition of an acid and the mixture was kept at 25° C. An aliquot (0.2 ml.) was withdrawn from the mixture at fixed time-intervals and diluted with glacial acetic acid (1.5 ml.). The diluted solution was immediately titrated with 0.02N perchloric acid/acetic acid to determine the concentration of the amino group liberated. The data thus obtained were submitted to the calculation of kinetic parameters using the above equation.

RESULTS

| Test compound | Acid | |
|---|---|---|
| | 80% CH₃COOH | 20% HCOOH in CH₃COOH |
| Mfoc.Phe.DCHA | $k_1 = 9.45 \times 10^{-3}$; $\tau = 73.3$ (Method A). | $k_1 = 4.71 \times 10^{-2}$; $\tau = 14.7$ (Method A). |
| Mfoc.Phe.Phe.OMe | | $k_1 = 4.73 \times 10^{-2}$; $\tau = 14.7$ (Method A). |
| Mfoc.Phe.DCHA | $k_1 = 9.89 \times 10^{-3}$; $\tau = 70.1$ (Method B). | |
| Mfoc-Phe.Phe.OMe | $k_1 = 6.91 \times 10^{-4}$; $\tau = 100$ (Method B). | $k_1 = 4.38 \times 10^{-2}$; $\tau = 15.8$ (Method B). |
| Bpoc.Phe.DCHA | $k_1 = 23 \times 10^{-2}$; $\tau = 21.6$ (Method A). | |
| Bpoc-Phe.Phe.OMe | | $k_1 = 1.29 \times 10^{-1}$; $\tau = 5.39$ (Method A). |
| Bpoc.Phe.Phe.OMe | | $k_1 = 2.12 \times 10^{-1}$; $\tau = 3.27$ (Method B). |
| Boc.Phe.Phe.DCHA | (*) | |

*Cleavage of Boc group became detectable on thin-layer chromatography after 42 hours at 25° C.

NOTE.—$k_1$: in min.$^{-1}$; $\tau$: in min.

What we claim is:
1. 9-methyl-9-fluorenyl phenyl carbonate.
2. 9-methyl-9-fluorenyl p-nitrophenyl carbonate.

References Cited

UNITED STATES PATENTS 2,931,828  4/1960  Prost _____ 260—482

OTHER REFERENCES

Anderson et al., J. Am. Chem. Soc. 79 6180-3 (1957).
Chemical Abstracts, vol. 64, 2155e–g (1966).
Chemical Abstracts, vol. 64, 2158c–e (1966).
Carpino et al., J. Am. Chem. Soc. 92 (19) 5748–9 (1970).

LEWIS GOTTS, Primary Examiner

D. G. RIVERS, Assistant Examiner

U.S. Cl. X.R.

260—112.5, 326.14 T, 326.3, 349, 468 J, 471 A, 481 R, 482 R, 482 C, 482 P, 514 J, 501.11, 501.12, 578 R, 534 R, 534 A, 534 B, 534 C, 534 E, 534 G, 534 L, 534 M, 534 S, 617 F